No. 820,179. PATENTED MAY 8, 1906

J. F. BYERS, DEC'D.
K. BYERS, ADMINISTRATRIX.
MECHANISM FOR CONNECTING VEHICLE AXLES AND BODIES.
APPLICATION FILED DEC. 26, 1903.

Witnesses.
A. J. Barber.
John N. Barber

Inventor.
John F. Byers.
By E. N. Barber,
Atty.

UNITED STATES PATENT OFFICE.

JOHN F. BYERS, OF RAVENNA, OHIO; KATE BYERS ADMINISTRATRIX OF SAID JOHN F. BYERS, DECEASED.

MECHANISM FOR CONNECTING VEHICLE AXLES AND BODIES.

No. 820,179.

Specification of Letters Patent.

Patented May 8, 1906.

Application filed December 26, 1903. Serial No. 186,616.

*To all whom it may concern:*

Be it known that I, JOHN F. BYERS, a citizen of the United States of America, and a resident of Ravenna, in the county of Portage and State of Ohio, have invented certain new and useful Improvements in Mechanism for Connecting Vehicle Axles and Bodies, of which the following is a specification.

My invention relates to improvements in mechanism for connecting a vehicle axle and body; and the object is to provide improved means coacting with the resilient functions of the springs for equalizing the compressing force of the spring and connecting the axle of the vehicle to the body, whereby the strain of the propelling force will be removed from the springs and reside in the axle and body connections, but each free to act independently of the other in the direction of the compression of the springs. I accomplish these objects by the means illustrated in the annexed drawings, to be taken as a part of this specification and to which reference being had.

Figure 1:
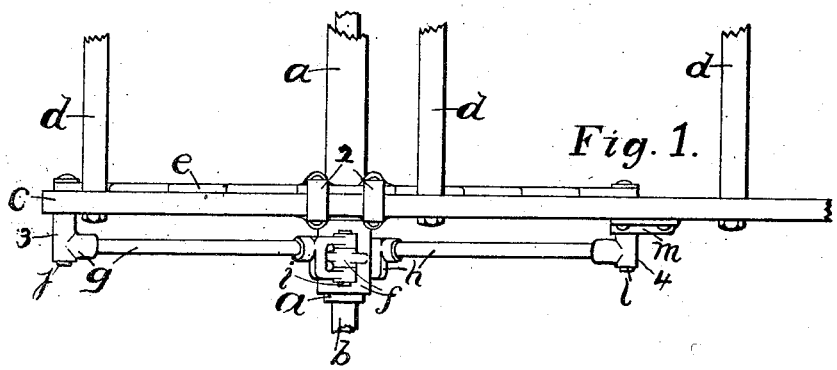
Figure 2:
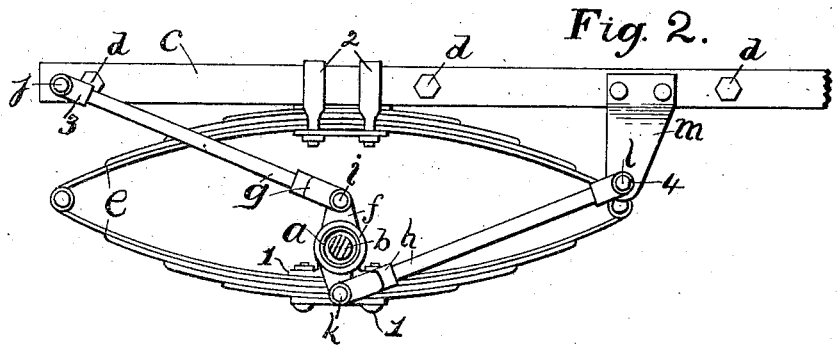
Figure 3:
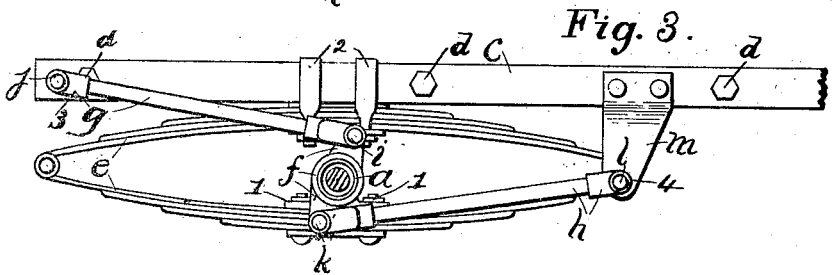

Figure 1 is a plan view of a part of the running-gear of a part of a vehicle having my improvements connected thereto and operatively associated therewith. Fig. 2 is a side view in elevation of one of the springs of a vehicle carrying my improved mechanism and operatively connecting the axle to the body part of the vehicle, the equalizer and connection being shown in the normal position. Fig. 3 is a side view of one of the springs in compressed condition, showing the position assumed by the elements of the device under such circumstances.

In the drawings the improved connecting mechanism is shown as loosely mounted on a tubular axle-sleeve adjacent to the end of the driving-axle of a motor-vehicle. It will be understood that a like mechanism is mounted at each side of the vehicle.

The axle-sleeve $a$ consists of a tube which is suitably secured to the springs by proper clips 1, substantially as indicated in the drawings. Within the axle-sleeve $a$ is rotatably positioned the driving axle or shaft $b$, which carries the driving-wheels of the vehicle in the usual manner. It has not been deemed necessary to show the driving-wheels, because their application to the axle is well vehicles and connected together by cross-bars $d$, the side bars and the cross-bars thus constituting a frame for supporting the body of the vehicle.

$e$ designates one of the side springs, which, as stated, is positioned opposite to a companion spring member and is secured to the side bar by clips 2, embracing the upper member of the spring and side bar $c$, as indicated in the drawings. The lower members of the springs are secured to the axle-sleeve $a$, as heretofore mentioned.

The equalizing and connecting mechanism embodying my improvements comprises a equalizing member $f$, formed with oppositely-extending radial arms and oppositely-disposed radial arms or bars $g$ $h$, having the inner ends pivotally connected to the outer ends of the said radial arms and their ends pivotally connected to the side bar the supporting-body frame. The equ $f$ consists of a hub mounted loosely on the bular axle-sleeve and formed with tely-directed radial arms. The conn rod $g$ has its inner end pivotally conn the outer end of the upper arm of the izer, as at $i$, as indicated, and its secured in a sleeve 3, mounted on a cured in the end portion of the side projecting laterally and horizont from. The connecting-rod $h$ ha end pivotally connected to the l the lower arm of the equalizer, its outer end secured to a sleeve loosely on a bolt $l$, projected fr depending arm $m$, secured to th dicated in the drawings.

It will be perceived that the the connecting-bars associate positioned in a plane parallel and to one side thereof, and by means of the axle-sleeve or driv on the axle-sleeve. Thus it will be seen hicle. and its connected membe ently of the spring in m quired vertical relation spring and the axle and free to perform all the supports.

It is apparent that rods are of equal leng pivotal points is such same distance above point $j$ is above the point $i$ and that with the usual or proper load on the springs a line passing through the points $l$ and $k$ will be in vertical direction, as indicated in Fig. 2 of the drawings. When the spring is further compressed, the point $k$ is moved rearward accordingly and the point $i$ is moved forward the same distance, thus causing a rocking movement of the equalizer on its bearing without the liability to move its axis either forward or rearward.

It will be further perceived that the propelling force is communicated from the axle to the body or frame through the equalizer and connecting-rods and that thus the springs are relieved entirely from the propelling strain, and this without interfering with their free action or movement.

When no body-supporting frame is used, the connecting-rod $g$ and arm $m$ may be secured directly to the body, and instead of the arm $m$ the body or frame may extend down far enough at this point to have the rod $h$ secured directly thereto.

Having thus described my invention, what I claim, and desire to secure by Letters Patent, is—

1. The combination with the side rails of a body-frame, and the driving-axle, of oppositely-positioned springs having their upper members secured to the body-frame, equalizers pivotally mounted on the axle and formed with oppositely-extending radial arms standing to the sides of and away from the springs, connecting-rods lying parallel with and outside of the springs, and having their inner ends pivotally connected to the ends of the upper arms of the equalizers and their outer ends pivotally secured to the side bars of the body-frame, connecting-rods pivoted to the ends of the lower arms of the equalizers and lying parallel with and outside of the springs, and rigidly-depending arms secured to the side rails and their lower ends pivotally secured to the outer ends of the second set of connecting-rods.

2. The combination with the side rails of a body-frame, and the driving-axle, of oppositely-positioned springs having their upper members secured to the body-frame, equalizers pivotally mounted on the axle and formed with oppositely-extending radial arms at one side of the axle, and standing to the sides of and away from the springs, connecting-rods lying parallel with and outside of the springs and having their inner ends pivotally secured to the ends of the upper arms of the equalizers and their outer ends pivotally secured to the side bars of the body-frame, connecting-rods pivoted to the ends of the lower arms of the equalizers and lying parallel with and outside of the springs, any portion in different horizontal rigidly-depending arms secured to the rails and their lower ends pivotally to the upper end of the second set of rods.

3. The combination with a body-frame, oppositely-positioned springs having their upper members secured to the side bars of the body-frame, a stationary tubular axle-sleeve carried by the lower members of the springs, and an axle rotatably mounted in the bore of the axle-sleeve, of equalizers pivotally mounted on the axle-sleeve and formed with oppositely - extending radial arms disposed at right angles to the axis of the axle, and standing to the sides of and away from the springs, connecting-rods lying parallel with and outside of the springs and having their inner ends pivotally secured to the ends of the upper arms of the equalizers and their outer ends bent at right angles to their body and pivotally secured to the side bars of the body-frame, connecting-rods having their inner ends pivotally secured to the ends of the lower arms of the equalizers and lying parallel with and outside of the springs and having their outer ends bent at right angles to their bodies, rigidly-depending arms secured to the side rails, and bearing-bolts extending from their lower ends and adapted to pivotally engage and support the outer ends of the second set of connecting-rods.

Signed at Kent, Ohio, this 21st day of December, 1903.

JOHN F. BYERS.

Witnesses:
E. N. BARBER,
C. H. CURTISS.